(No Model.)
F. B. BADT.
MULTIPLE SERIES SYSTEM OF ELECTRICAL DISTRIBUTION.
No. 558,924. Patented Apr. 28, 1896.
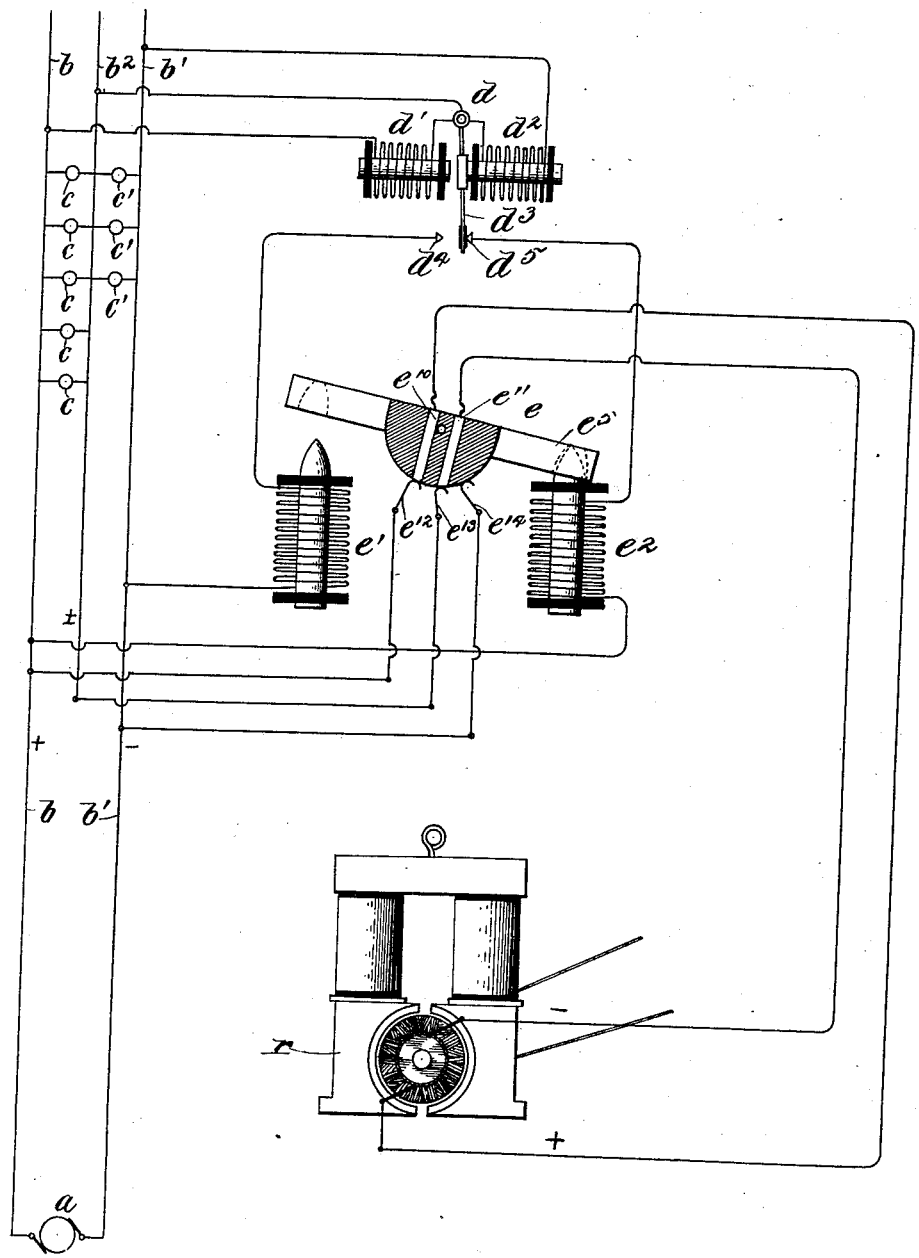
WITNESSES:
INVENTOR:
FRANCIS B. BADT,
BY Bartow & Brown,
ATTORNEYS.

UNITED STATES PATENT OFFICE.

FRANCIS B. BADT, OF CHICAGO, ILLINOIS, ASSIGNOR TO THE SIEMENS & HALSKE ELECTRIC COMPANY OF AMERICA, OF SAME PLACE.

MULTIPLE-SERIES SYSTEM OF ELECTRICAL DISTRIBUTION.

SPECIFICATION forming part of Letters Patent No. 558,924, dated April 28, 1896.

Original application filed September 25, 1895, Serial No. 563,601. Divided and this application filed December 6, 1895. Serial No. 571,231. (No model.)

*To all whom it may concern:*

Be it known that I, FRANCIS B. BADT, a citizen of the United States, residing at Chicago, in the county of Cook and State of Illinois, have invented a certain new and useful Improvement in Multiple-Series Systems of Electrical Distribution, (Case No. 66ª,) of which the following is a full, clear, concise, and exact description, reference being had to the accompanying drawing, forming a part of this specification.

My invention relates to a multiple-series system of distribution and method of regulating the same, the object of my invention being to provide improved means for maintaining a balance of the system.

According to the Hopkinson three-wire system of multiple-series distribution two dynamos or generators are connected in series and three conductors extend from the dynamos to the district to be supplied with energy, two of the conductors being connected with the outside brushes of the connected dynamos while the intermediate or compensating conductor is connected with the joined brushes of the two generators. A divided source of electricity is provided which preserves a balance upon the two sides of the system, the voltage of the neutral or compensating conductor being maintained practically constant.

It is the object of the present invention to provide a multiple-series system of distribution in which the divided source of electricity at the central station may be dispensed with, as may also the compensating conductor extending to the central station. In an application, Serial No. 563,601, filed by me September 25, 1895, I have described a multiple-series system of electrical distribution, and the present application is a division of said application.

In accordance with the present invention a compensating conductor is provided, which, however, does not extend to the generator at the central station, the translating devices being connected in multiple series between the compensating conductor and the main conductors. When a compensating conductor is employed without a divided source of electricity, any change of load whereby one side of the system becomes underloaded results in a change of the voltage of the compensating conductor, the voltage of the underloaded side of the system becoming greater than that of the overloaded side. In order to maintain a balance of the system, I provide a source of electricity, preferably a dynamo or generator, adapted to be shifted from one side of the system to the other as the load changes, whereby the source of electricity is connected in circuit with the overloaded side of the system to supply energy to the system on the overloaded side and thereby maintain a balance of the system. The source of electricity may be provided in the vicinity of the consumption-circuits, or it may be situated at the central station and the compensating conductor extended to the central station, though the former arrangement is preferable. When a generator is employed, it may be driven by a steam-engine or other prime motor, or it may be driven by an electric motor connected in circuit in any desired manner.

In the application above referred to I have described and claimed a system wherein a motor is provided adapted to be automatically switched from one side of the system to the other to maintain a balance, the motor being connected in circuit with the underloaded side, whereby the balance of the system is maintained by the automatic application of a load to the underloaded side.

The present application is drawn to the feature of a source of electricity adapted to be connected in circuit with the overloaded side as contradistinguished from the consumer of electricity adapted to be connected in circuit with the underloaded side, as described in the above-mentioned application.

I provide automatically-actuated electromagnetic means for switching the source of electricity from one side of the system to the other, the electromagnetic means being responsive to a change of the predominating load from one side of the system to the other for maintaining the source of electricity in circuit with the overloaded side. I preferably construct the switching apparatus in the form of a relay, the contact-arm of which is adapted to be moved in one direction or the other to connect in circuit one or the other of the magnets of a controlling-switch, the contact-points of which control the circuit through the generator or other source of electricity.

I have illustrated my invention diagrammatically in the accompanying drawing, in which the main generator or source of electricity $a$ is illustrated as connected in circuit with main conductors $b\ b'$, extending to the district of distribution, the relay devices $c\ c'$ being connected in multiple series between the main conductors $b\ b'$ and a compensating conductor $b^2$. The electromagnet-coil $d'$ of a relay $d$ is connected between the conductors $b\ b^2$, while the coil $d^2$ is connected between the conductors $b^2\ b'$. The vibrating lever $d^3$ of the relay is adapted to engage one or the other of the contact-anvils $d^4\ d^5$ and is electrically connected with the compensating conductor $b^2$. The anvil $d^4$ is connected, through the electromagnet-coil $e'$ of the controlling-switch $e$, with the main conductor $b'$, while the anvil $d^5$ is connected, through the coil $e^2$, with the main conductor $b$. The controlling-switch is provided with a pivoted armature-lever $e^5$, adapted to be rocked into one or the other of its alternative positions, according as one or the other of the coils $e'$ or $e^2$ is excited. Contact-plates $e^{10}\ e^{11}$ are carried upon the armature-lever $e^5$ and are connected, respectively, with the opposite poles of the generator or source of electricity $r$. Contact-brushes $e^{12}\ e^{13}\ e^{14}$ are provided, connected, respectively, with the conductors $b\ b^2\ b'$.

The operation of the system is as follows: Supposing the load between the conductors $b'\ b^2$ to be below that between the conductors $b\ b^2$, the voltage between the conductors $b'\ b^2$ tends to increase and an abnormal current flows through the coil $d'$, thus moving the arm $d^3$ into engagement with the anvil $d^5$ and closing circuit through coil $e^2$. The armature-lever is thus drawn into the position indicated and the contact-plates $e^{10}\ e^{11}$ are moved into contact with the brushes $e^{12}\ e^{13}$, respectively, thus connecting the generator $r$ in circuit with the overloaded side of the system—that is, with the conductors $b\ b^2$. The generator $r$ thus assists the main generator $a$ and preserves the balance of the system. When the load between the conductors $b'\ b^2$ falls below that on the opposite side of the system, the armature-lever $e^5$ is rocked in the opposite direction to connect the generator $r$ in circuit between the conductors $b'\ b^2$.

Throughout the specification I have employed the terms "overloaded" and "underloaded" as relative terms, the side designated as the overloaded side being the side which at any instant is carrying the greater load, while the underloaded side is the side carrying the smaller load.

I have described my system in connection with a three-wire system; but, as will be evident, it is applicable to a system wherein four or more conductors are employed between which the translating devices are connected in multiple series.

Having described my invention, what I claim as new, and desire to secure by Letters Patent, is—

1. In a system of electrical distribution, the combination with the translating devices connected in multiple series between a compensating conductor and main conductors, of an auxiliary generator or source of electricity, a switch for connecting said generator in circuit with one or the other of the sides of the system, and an electromagnetic device responsive to a change of the predominating load from one side of the system to the other for maintaining said auxiliary generator in circuit with the overloaded side of the system; substantially as described.

2. In a system of electrical distribution, the combination with translating devices connected in multiple series between main and compensating conductors, of an auxiliary source of electricity, an electrically-operated controlling-switch for connecting said source of electricity in circuit upon one or the other of the sides of said system, and a relay for automatically controlling the circuit through said controlling-switch; substantially as described.

In witness whereof I hereunto subscribe my name this 4th day of December, A. D. 1895.

FRANCIS B. BADT.

Witnesses:
W. CLYDE JONES,
JOHN W. SINCLAIR.